Feb. 9, 1960 C. R. HANNA ET AL 2,924,200
AIRCRAFT FLIGHT CONTROL APPARATUS
Filed March 4, 1953 4 Sheets-Sheet 1
Fig.I.
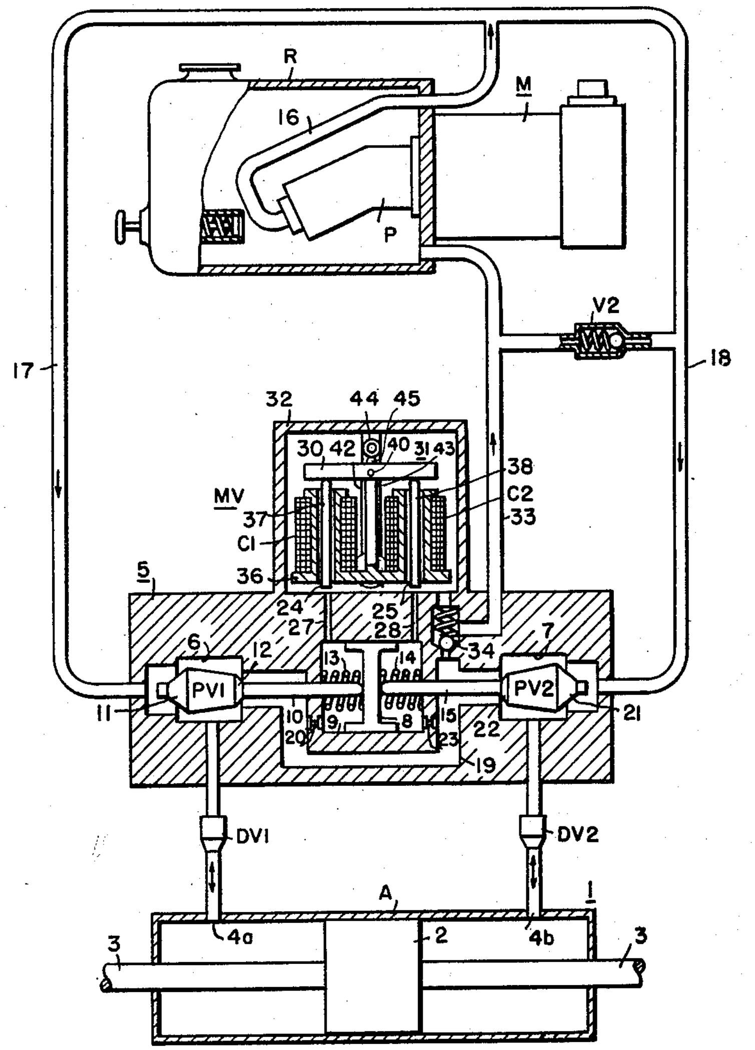
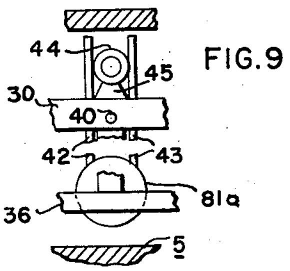
FIG.9
WITNESSES:
E. A. McCloskey.
E. L. Oberheim
INVENTORS
Clinton R. Hanna, Kirk A. Oplinger
and Lawrence B. Lynn.
BY
Paul E. Friedemann
ATTORNEY Feb. 9, 1960 C. R. HANNA ET AL 2,924,200

AIRCRAFT FLIGHT CONTROL APPARATUS

Filed March 4, 1953 4 Sheets-Sheet 2

WITNESSES:
E. A. McCloskey.
E. F. Oberheim

INVENTORS
Clinton R. Hanna, Kirk A. Oplinger
and Lawrence B. Lynn.
BY
Paul E. Friedemann
ATTORNEY Feb. 9, 1960 C. R. HANNA ET AL 2,924,200

AIRCRAFT FLIGHT CONTROL APPARATUS

Filed March 4, 1953 4 Sheets-Sheet 3

WITNESSES:
E. A. McCloskey
E. F. Oberheim

INVENTORS
Clinton R. Hanna, Kirk A. Oplinger
and Lawrence B. Lynn.
BY
Paul E. Friedemann
ATTORNEY Feb. 9, 1960 C. R. HANNA ET AL 2,924,200

AIRCRAFT FLIGHT CONTROL APPARATUS

Filed March 4, 1953 4 Sheets-Sheet 4

WITNESSES:

E. A. McCloskey.

E. L. Oberheim

INVENTORS

Clinton R. Hanna, Kirk A. Oplinger and Lawrence B. Lynn.

BY

Paul E. Friedemann

ATTORNEY 2,924,200
Patented Feb. 9, 1960

2,924,200

AIRCRAFT FLIGHT CONTROL APPARATUS

Clinton R. Hanna, Pittsburgh, Kirk A. Oplinger, Verona, and Lawrence B. Lynn, Pittsburgh, Pa., assignors to Westinghouse Electric Corporation, East Pittsburgh, Pa., a corporation of Pennsylvania

Application March 4, 1953, Serial No. 340,248

11 Claims. (Cl. 121—41)

This invention relates generally to control apparatus for controlling movable bodies and more in particular to such apparatus which is usable in controlling an airplane about one or more of its axes of freedom.

Apparatus of this general type frequently uses a power piston having a mechanical connection with the body to be controlled for controlling the movement of the body in dependence of movement of the piston. In some applications, force is applied to the body by the piston in one direction only, there being some other means for returning the body to a given neutral or starting position. In other instances, force is applied to the body in each of two directions by the piston to effect reversible movement of the body.

In such hydraulic drives, fluid under pressure is supplied to the piston (usually referred to as a "power piston") from a supply of fluid pressure through the medium of a system of valves, which may be manually or automatically controlled to obtain the desired operation of the body. The requirements of such a drive may vary in certain respects from one application to another, but, as a general proposition, it is desirable that high-speed, high-power performance be obtainable, together with a minimum dead band in the vicinity of zero error. Moreover, a system such as this, particularly in aircraft applications, should be relatively stable, which indicates a degree of damping commensurate with system stiffness. Other important considerations in most applications include compactness, lightness of weight, ease of manufacture, serviceability and durability, to mention a few.

Such features are particularly important in the application of hydraulic drives in aircraft controls as boosters for actuating the control surfaces in dependence of manually or automatically produced control quantities. Such systems are finding increasing application on modern aircraft because of the increasing size of these aircraft or because of the present high operating speeds, or both. The control surfaces on these aircraft often require operating torques in excess of those which can be supplied conveniently through manual effort. Booster systems usually are either electric or hydraulic. Recently, hydraulic systems have been more frequently employed because of the weight advantage.

The introduction of any type of a power assist or boost between a signal source and the member to be controlled introduces additional time delays which may result in instability. Situations of this general type are quite common in aircraft, especially if the aircraft is not particularly well damped about the axis to which the power assist or boost is applied. In such instances, oscillation about the given axis may occur, and in any such booster system, provision should be made to minimize or obviate this condition.

In general, the system herein disclosed incorporates a hydraulically-operated power piston connected to a control surface of the aircraft. The application of fluid pressure to opposite sides of the piston for selectively driving the piston in each of two directions is controlled by means of an electro-mechanical hydraulic multiplier valve, which selectively regulates the fluid pressure admitted to the respective sides of the power piston in dependence of signals originating, for instance, in an autopilot or, in dependence of a manually initiated control signal.

In the present system, provision is made for manually overriding the automatic signal by the manual control for obtaining power boost from a point of manually initiated control to the control surface and for directly controlling the control surface through mechanical linkages. These features provide a system which is completely safe since in the event of failure of the automatic controls or of hydraulic pressure, connections exist whereby the human pilot may, through manual effort, control the control surfaces. The application of this invention in an aircraft control is demonstrated in connection with a single axis only. However, such a control may be applied to each of the three principal control axes according to the teachings of this invention.

One object of this invention is to provide a system for driving a member to be controlled, which is simple with respect to operational requirements and positive in operation.

Another object of this invention is to provide a booster system in which time delays are a minimum.

A further object of this invention is to provide a booster system for operating a control surface of an aircraft wherein provision is made for providing adequate damping.

It is also an object of this invention to provide a control system of the character herein generally referred to wherein manual and automatic signals may be independently or simultaneously applied.

A more specific object of this invention is to provide a booster system for an aircraft control surface wherein manual control of the booster system is given a "feel" similar to that experienced in direct manual control of the control surface of the aircraft but to a lesser degree.

Still another object of this invention is to provide a control system for an aircraft which stabilizes the aircraft about the given control axis.

Further to the preceding object, it is also an object of this invention to provide such an automatic stabilizing system for an aircraft in which provision is made for manually overriding the booster control.

In a more specific sense, it is an object of this invention to provide a hydraulic booster control for an aircraft having a direct mechanical linkage for controlling a given control surface, wherein certain torques or forces developed in such linkage upon the application of control by the human pilot are utilized as control signals for piloting the hydraulic boost system.

The foregoing statements are merely illustrative of the various aims and objects of this invention. Other objects and advantages will become apparent upon a study of the following specification when considered in conjunction with the accompanying drawings, in which:

Figure 1 is a schematic illustration of a portion of the hydraulic equipment of this invention;

Fig. 9 is an enlarged vtiew of the bias leaf springs and armature of the first valve stage of Fig. 1 with portions broken away to better illustrate the structure.

Figures 2, 3:
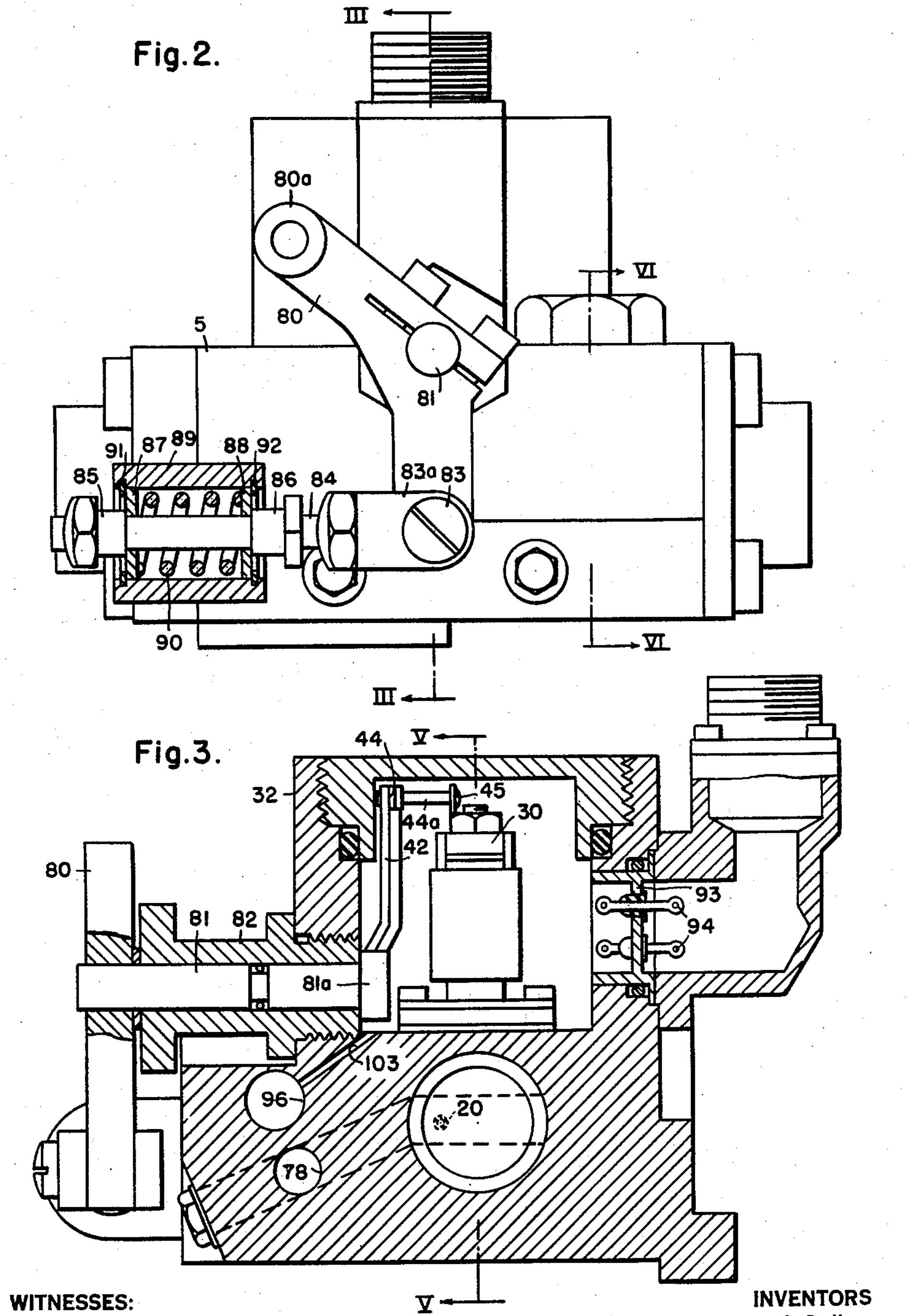
Fig. 2 is a side elevational view of a practical hydraulic multiplier valve of the type utilized in the hydraulic system of Fig. 1.
Fig. 3 is a sectional view of the multiplier valve taken on the line III—III of Fig. 2.
Figure 4:
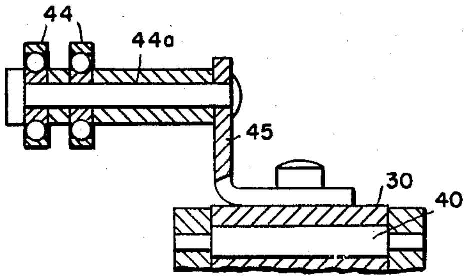
Fig. 4 is an enlarged sectional detail of a crank arm connected to the armature of the electromagnet of the hydraulic multiplier valve.
Figure 5:
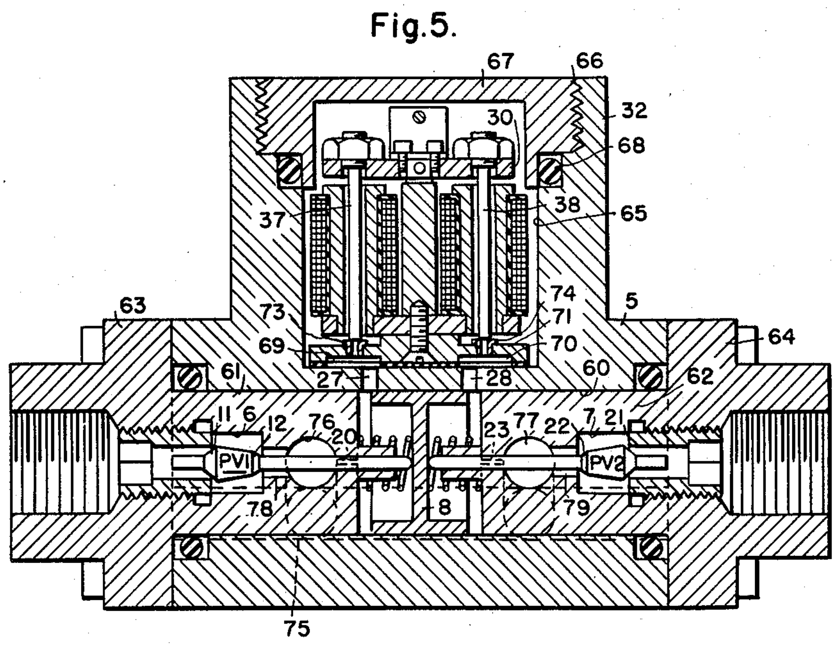
Fig. 5 is a sectional view of the multiplier valve taken on the line V—V of Fig. 3.

In the application of force to a body which is to be displaced, a piston actuator, generally designated A, including a cylinder 1 and a piston 2 slidably mounted therewithin, is provided with a piston rod 3 adapted for connection by a suitable linkage (not shown in Fig. 1 but appearing in Fig. 8) to the body which is to be displaced. In Fig. 1, the displacement of piston 2 is controlled by fluid pressure selectively admitted through ports **4*a* and 4*b*** on opposite sides of the piston by an electro-mehcanical hydraulic multiplier valve generally designated MV.

This valve comprises a main body portion generally designated 5, which is provided with respective valve cavities 6 and 7 in which respective poppet valves PV1 and PV2 are disposed. These poppet valves are slidably mounted and are actuated by a multiplier piston 8 disposed within a centrally located cylinder 9 in a position between the respective poppet valves. The multiplier piston 8 is connected to the poppet valves by means of respective push rods 10 and 15. Springs 13 and 14 provide centering forces which tend to return the piston 8 to a predetermined neutral position under conditions of a quiescent fluid pressure. Each of the poppet valves PV1 and PV2 controls an inlet and a discharge port. These ports for poppet valve PV1 are designated 11 and 12, respectively, and for the poppet valve PV2 are designated 21 and 22, respectively. Respective ports **4*a* and 4*b* of the cylinder 1 are connected with poppet valve cavities 6 and 7 through linear damping valves DV1 and DV2**, which will be described at a later point.

The fluid pressure supply for this system comprises a pump P, which is disposed within a hydraulic fluid reservoir, generally designated R. Pump P is driven by a motor M and picks up fluid from the reservoir, which is discharged under pressure into a conductor 16 which supplies the parallel fluid conductors 17 and 18 connected to the respective inlet ports 11 and 21 of the poppet valves.

As illustrated, the poppet valves are open in their normally centered positions, and, therefore, fluid pressure flows through the respective inlet ports 11 and 21 through the respective damping valves DV1 and DV2 from valve cavities 6 and 7 through ports **4*a* and 4*b* to opposite sides of the power piston 2. The discharge ports of the respective poppet valves are connected by a common conductor 19. Metering orifices 20 and 23 in the end walls of the cylinder 9 of the multiplier piston, communicate with conductor 19**, providing for the admission of controlled volume rates of fluid under pressure to opposite sides of the multiplier piston.

The actual pressure existing on opposite sides of the multiplier piston, referred to herein as the pilot pressure, is controlled by respective pilot valves 24 and 25, which communicate, respectively, with opposite sides of the multiplier piston through conductors 27 and 28. The pilot valves 24 and 25 are controlled by an armature 30 of an electromagnetic driver, generally designated 31, which is located within a sealed chamber 32 on the upper side of the valve body.

The return circuit to the reservoir is completed by a fluid conductor 33, which is connected to the discharge conductor 19 by means of a pressure regulator valve 34. Fluid from the housing 32 is ported from the housing cavity through the cavity of the regulator valve 34 to the return fluid conductor 33.

A relief valve designated V2, connected between an inlet conductor such as 18 and discharge conductor 33, circulates fluid around the pump between the pump outlet 16 and the reservoir at such time as the fluid pressure reaches a given maximum value. In the event a regulated pressure pump is utilized, a relief valve, such as V2, may not be necessary.

The electromagnetic driver which operates the pilot valves 24 and 25 comprises a pair of coils C1 and C2, which are disposed about the outer legs of an inverted E-shaped core member 36. Respective stems 37 and 38 of pilot valves 24 and 25 are slidably fitted in suitable bores provided centrally of the outer legs of the core. Armature 30 is pivotally mounted at its center by a pin 40 to a point adjacent the upper extremity of the central leg, and in this position engages the upper ends of respective stems 37 and 38, which latter are held in the positions indicated by fluid flow passing through respective passages 27 and 28 into the housing 32. From this arrangement, it will be appreciated that by unbalancing the energizing voltages of coils C1 and C2, the armature will be tilted about its pivot pin 40, driving a valve stem, such as 37, downwardly, for instance, while permitting valve stem 38 to be moved upwardly due to the force produced by fluid impinging upon its flat lower extremity.

By this expedient, the magnetic forces applied through the armature 30 oppositely vary the fluid gaps at the respective pilot valves 24 and 25, producing a pilot pressure differential across the multiplier piston 8 to cause this piston to be displaced in one direction or the other, thereby selectively controlling the respective poppet valves PV1 and PV2 to correspondingly actuate the power piston.

In order to obviate the possibility of oscillation in the system, positive centering of the armature 30 is provided by means of a pair of flat leaf springs 42 and 43 which are disposed on opposite sides of a roller 44 mounted at the end of an arm 45, which is radially disposed of the armature pivot pin 40 and connected to the armature. These centering springs minimize the possibility of sustained oscillation by providing a degree of positive centering and have a sufficiently low spring rate to minimize interference with the normal operation of the valve. As will be seen by reference to Fig. 1, these springs are mounted vertically of the assembly on opposite sides of the roller 44.

Provision is made for manually deflecting springs 42 and 43 through a connection at their lower ends to provide torqucs acting on the armature about the pivot pin 40 overriding the electromagnetic control. The details of this construction will be described in connection with Figs. 2 through 6 to be described hereinafter.

Although the circuits have not been shown in the interest of simplicity, one way of controlling the coils of the electromagnetic driver is to connect these coils as adjacent legs of a conventional bridge circuit, the remaining two legs of which may be comprised of tapped portions of any suitable type of variable impedance, such as a potentiometer, whereby the bridge circuit may be unbalanced to unbalance the voltages of the respective coils. Features such as this are common expedients and are not detailed herein in the interest of simplicity.

Assuming that the armature 30 of the electro-magnetic driver is tilted in a counterclockwise direction, either by manually applied torques or by magnetic biases, a differential motion of the valve stems of the pilot valves will be produced. This changes the fluid gaps at the valves in opposite senses and unbalances the pressures on the two sides of the multiplier piston, causing a proportional displacement of the multiplier piston to the right, which correspondingly unbalances the pressure drops across the inlet and discharge valves.

The multiplier piston motion described opens inlet port 11, closes discharge valve 12, opens discharge valve 22, and closes inlet valve 21. The normal flow of fluid around the loop is now from conductor 17 through inlet port 11 into valve cavity 6. From valve cavity 6, the fluid flows through linear damping valve DV1 to the left side of power piston 2. The pressure drop across the power piston is from left to right, tending to displace this piston towards the right as viewed. Diminishing volume on the right side of the power piston exhausts fluid through linear damping valve DV2 into valve cavity 7 of poppet valve PV2. This fluid flows through discharge valve 22 into conductor 19, through pressure regulator valve 34, into outlet conductor 33 from which it discharges into the reservoir R. Movement of the piston 2 continues until such time as the resistance of the load which it is driving, such as a control surface of an aircraft, balances the force due to the unbalanced fluid pressure. Alternatively, if the load resistance does not increase with displacement, this motion may be stopped by a suitable instrumentality, such as a potentiometer PT, responsive to displacement of the member being controlled, which rebalances the voltages acting on the electrical coils of the electromagnetic driver. Such an arrangement is shown in application Serial No. 619,549, entitled, "Flight Control System," filed October 31, 1956, invented by A. P. Rasmussen and P. E. Seeley, and assigned to the common assignee.

Figures 6, 7:
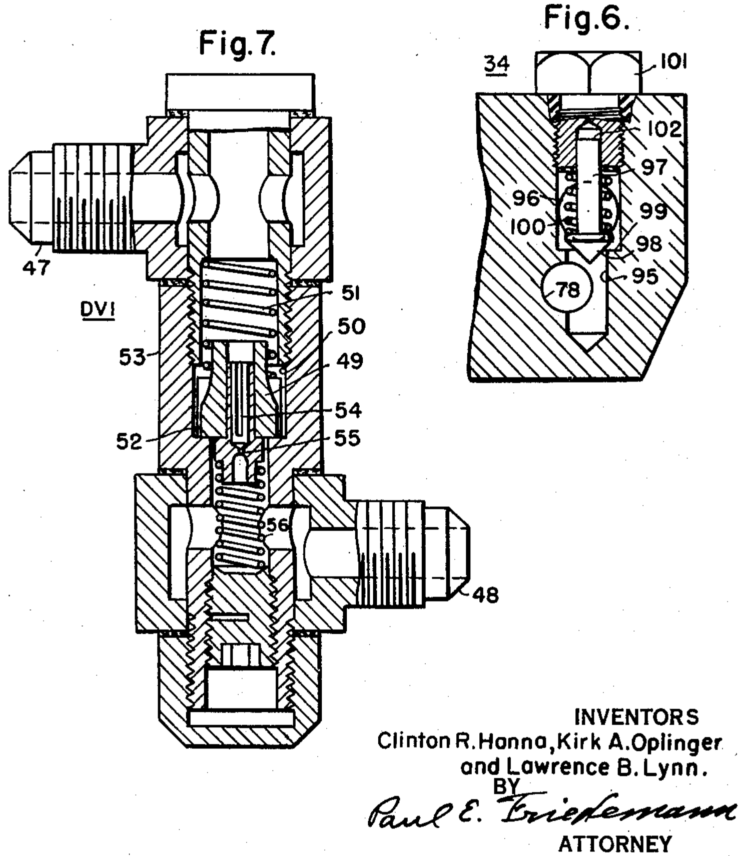
Fig. 6 is a fragmentary sectional view of the pressure regulator valve in the multiplier valve, which section is taken on the line VI—VI of Fig. 2.
Fig. 7 is a longitudinal sectional view of one of the two linear damping valves employed in the hydraulic system.

The damping valves DV1 and DV2, located in the hydraulic lines leading to the actuating cylinder, introduce a pressure drop which is linearly proportional to the rate of flow of the fluid and thus to the velocity of the control surface which is being moved. The details of these valves, which are the same, are illustrated in Fig. 7. (See U.S. Patent 2,179,292.) Damping of fluid movement through these valves is obtained in one direction only, namely, from top to bottom of the valve assembly as seen in Fig. 7. Hence, the upper port 47 may be termed the "damping port," and the lower port 48 may be termed the "free-flow port." When fluid flow is from bottom to top, the check valve 49, which is slidably mounted in valve cavity 50, is displaced upwardly against a relatively weak relief spring 51, which lifts the check valve 49 from its seat 52 in the valve body 53 and permits relatively free flow of fluid thereabout and out of the damping port 47. For the reverse direction of fluid flow, namely, into the damped-flow port and out of the free-flow port, fluid entering the damped-flow port must pass through either a variable orifice 54 or a fixed orifice 55 to reach the port 48 at the opposite end.

The pressure drop across the fixed orifice 55 is proportional to the square of the rate of flow of the fluid passing through it, whereas the pressure drop across variable orifice 54 is proportional to the ⅔ power of the rate of fluid flow through it. This latter characteristic results from the fact that the size of the variable orifice, determined by the deflection of a calibrated spring 56 against which the damping valve seats, is proportional to the pressure drop. Inasmuch as the variable orifice when opened and the fixed orifice are in parallel, the fluid flow must divide between them in such a manner that the pressure drops across them are the same or substantially the same. This matching of the two orifice characteristics is such that the pressure drop across the damping valve is linearly proportional to the combined rate of flow of fluid through the orifices. When fluid is flowing in the free flow direction of one damping valve, system damping is obtained from the action of the damping valve connected to the other end of the actuating cylinder. These valves are oriented so that damping forces are applied to the piston and control surface when oil is forced through the valves by the actuator or power piston.

Additional details of the multiplier valve system appear in Figs. 2 through 6, representing one of a number of practical forms such a valve may have.

As will be seen from Figs. 2 through 6, the valve body 5 is provided with a horizontal bore 60 extending completely through the body. The respective poppet valve assemblies comprising housings 61 and 62 are fitted into opposite ends of this bore. Respective flanges 63 and 64 provide means for securing and sealing the valve bodies to the multiplier valve body 5. The multiplier piston 8 is slidably mounted in this bore between the confronting extremities of the poppet valve bodies, and this cavity communicates with passages 27 and 28 which in turn communicate with cavity 65 in the housing 32 of the magnetic driver. The upper end of housing 32 is threaded at 66 internally to receive a cap 67 which is sealed to the housing 32 by means of an O-ring 68. Passages 27 and 28, respectively, communicate with recesses 69 and 70, which are formed in the bottom of a plate 71 in which pilot valve bushings 73 and 74 are secured. The flat bottom faces of pilot valve stems 37 and 38 are disposed immediately above the upper faces of respective bushings 73 and 74 and are of a diameter just slightly larger than the openings provided through the respective bushings so that when seated upon the upper faces of these bushings they are effective to seal off the valves.

The respective discharge ports 12 and 22 of poppet valves PV1 and PV2 connect with passages 76 and 77, which are drilled through the side of the valve body 5 to points intersecting passages 78 and 79 extending from respective valve cavities 6 and 7. Passages 76 and 77 are intersected by a passage 75 passing through the valve body 5 at right angles to the passages 76 and 77. The ends of passage 75 are sealed beneath the flanges 63 and 74 of the poppet valve housings. Passages 76, 77 and 78 correspond to the passage 19 illustrated in Fig. 1. Small metering orifices 20 and 23 extend from respective passages 76 and 77 through the ends of the poppet valve housings which define the ends of the cylinder in which the multiplier piston 8 operates.

The pressure regulator valve 34 shown in Fig. 6 is fitted into a cavity 95, which is formed in the multiplier valve body 5 in a position intersecting an outlet passage 96 and passage 78, which connects with the discharge ports of the respective poppet valves. This valve comprises a spring bias plunger 97, the bottom end of which terminates in a valve member 98 cooperating with a valve seat 99 formed in the cavity 95. A calibrating spring 100 applies a closing force to the pressure regulator valve. The cavity 95 is closed by means of a threaded plug 101 provided with an axial counterbore 102 through its bottom face, which receives the upper end of the stem 97 of the pressure valve to guide the axial movements of this valve. Passage 103 drains the cavity in housing 32 into outlet conductor 96. Outlet conductor 96 is adapted for connection to discharge conductor 33 shown in Fig. 1.

Figs. 2, 3, and 9 illustrate the manual override and spring-centering arrangement connected to the armature 30. As will be seen in Fig. 3, a bell crank 80 is pivotally secured to a shaft 81 rotatably journalled in a bushing 82 threading into the side of the housing 32. Respective springs 42 and 43 (of which only 42 appears in Fig. 3) are connected at their lower ends to a hub 81*a* secured to the inner end of shaft 81 and extend upwardly to engage opposite sides of roller 44 mounted upon a shaft 44*a*, which is mounted adjacent the upper end of arm 45 which projects upwardly from the top of armature 30. The details of this construction are shown to an enlarged scale in Fig. 4.

The lower end of bell crank 80 (as best seen in Fig. 2) is connected to a fork 83*a* by means of a pin 83. Fork 83*a* is connected to a shaft 84 provided with respective shoulders 85 and 86 which seat upon the outer faces of respective plates 87 and 88 slidably mounted within a housing 89 secured to the side of the multiplier valve body 5. A spring 90 is compressed between the inner faces of respective washers 87 and 88. In this position, the plates abut the respective shoulders 85 and 86, and the assembly is located against axial travel within the housing 89 by a pair of ring washers, 91 and 92, which are fitted into internal grooves adjacent the ends of the housing and in positions abutting the respective plates. It will be seen that this mechanical arrangement securely holds the bell crank 80 in a fixed angular position, in which position the centering springs 42 and 43 slightly bias the armature 30 to its neutral position. The armature is mechanically biased by applying forces to the end 80a of the bell crank which rotates the shaft 81 in one direction or the other against the bias of loading spring 90 and angularly displaces leaf springs 42 and 43 to apply torques to the armature about its pivot 40.

Suitable electrical connections are brought into the respective coils C1 and C2 of the electromagnet by means of a fluid-tight terminal having connectors extending in fluid-tight relation through a diaphragm 93. These connectors are designated 94.

Figure 8:
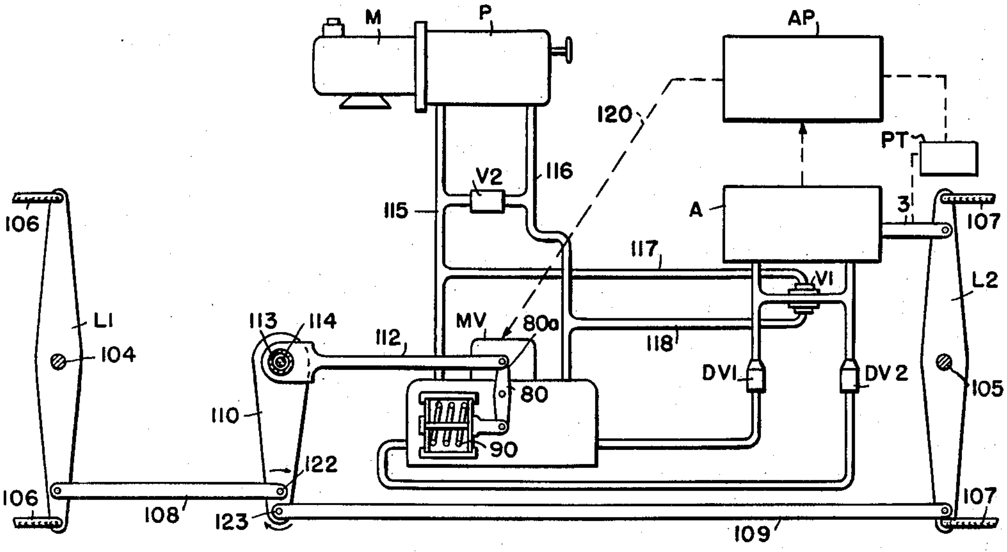
Fig. 8 is a schematic illustration of a complet control system embodying the principles of this invention.

The complete system is illustrated in Fig. 8. In this system, parts generally corresponding to those illustrated in Fig. 1 bear like reference characters. Assuming for the purposes of this discussion that the system herein disclosed is to be utilized in controlling the rudder of an airplane, a lever, such as L1, pivotally mounted at its center about a fixed pivot 104 may be connected by means of suitable cables 106 to the manual rudder control of the airplane. Lever L1 is connected to a lever L2 by means of a linkage including push rods 108 and 109 having a common connection to control arm 110. Lever L2 is pivoted at 105 and connected to the rudder (not shown) by means of control cables 107. Control arm 110 is connected to a link 112 by means of a sleeve 113 which is loosely fitted about a fixed pin 114, allowing a degree of lateral displacement of the sleeve 13 thereabout. The other end of link 112 is connected to the end 80a of bell crank 80.

The remaining portion of the system herein illustrated differs from that previously described in connection with Figs. 1 through 7 in the addition of a fluid bias circuit including a by-pass and shut-off valve VI, which is connected across the ports of the power piston cylinder. In the interest of simplicity, the three-conductor fluid system shown in Fig. 1 is here illustrated as a two-conductor system, in which case, either of conductors 115 and 116 may be the high-pressure fluid conductor and the remaining one the lower-pressure fluid conductor to provide a circulating system between the reservoir and the pilot valves of the multiplier valve MV. With this arrangement, fluid pressure conductors 117 and 118 are conveniently connected between conductors 115 and 116, respectively, and opposite sides of the by-pass and shut-off valve, which is controlled by these fluid pressures. Normally, when pressure is applied to conductors 115 and 116 from the pump P, the by-pass valve V1 is maintained closed by the pressure differential thereacross, in which case no fluid may flow through valve V1 between the respective ports in the cylinder of the power piston. However, at such times as the fluid pressure is removed from conductors 115 and 116, this fluid pressure is removed and by-pass valve V1 is opened, providing free flow for hydraulic fluid from one end of the power piston cylinder to the other. This provides a means for effectively disconnecting the link L2 from the hydraulic system whereby direct control of the rudder through the illustrated mechanical linkage from the manual control operated by the pilot is achievable.

The automatic pilot is illustrated herein in block form and designated AP. Such an automatic pilot may be any one of several conventional types having means therein for producing an error signal in dependence of a change in angular position of the craft about the given control axis—in this case the yaw axis—which electrical quantity is applied through suitable circuitry, illustrated schematically by the broken line 120, to the coils of the electromagnetic driver controlling the multiplier valve. Alternatively, such an automatic pilot may be of the rate-sensitive type illustrated in a copending application of Clinton R. Hanna, Serial No. 785,983, filed on November 14, 1947, now Patent No. 2,638,288 entitled "Control Systems for Craft Operable in Space" and assigned to the assignee of this invention.

The automatic pilot in the aforesaid application involves rate gyroscopes having a single degree of freedom, which are respectively slaved to the respective control axes of the airplane, each producing an output in dependence of angular rates about its corresponding axis. In the case of the yaw axis, the yaw rate gyroscope responds to angular rates in yaw and is effective by its precessional movement about its single output axis to produce an electrical quantity indicative of the magnitude and the sense of such angular rate, this electrical quantity being utilized, as aforesaid, to control the excitation of the coils of the electromagnetic driver of the multiplier valve. Since such details per se form no part of the present invention, they have not been illustrated in the interest of simplicity.

When the system is under the control of the automatic pilot, angular rates in yaw result in differential pilot pressures which displace the multiplier piston 8 as viewed in Fig. 1 to correspondingly control the respective poppet valves. The poppet valves in turn control the differential pressure across the power piston, which is therefore displaced, angularly displacing the lever L2 connected to the rudder by cables 107. The rudder is displaced in a direction to check the detected angular velocity in yaw, and at the instant the velocity is checked, the rate gyroscope removes the control signal which it applied to the coils of the electromagnetic driver. Under this mode of operation, the system functions essentially as a yaw damper. Inasmuch as the rate gyroscope has no position sense, suitable means may be provided as described in the aforesaid application of Clinton R. Hanna for imposing a directivity sense on the rate gyroscope or on the system.

If at any time during the operation of the system under the influence of the automatic pilot it should become necessary for the human pilot to momentarily take over control, this is accomplished by actuating the manual control which displaces the lever L1. Due to the radial displacement of the pivotal connections at 122 and 123 of respective push rods 108 and 109 on control arm 110 and due to the fact that the lever L2 is relatively immovable under these conditions due to the hydraulic pressures acting on the power piston, point 123 tends to remain fixed. Thus, a couple is applied to control arm 122 about point 123, tending to angularly displace control arm 110 thereabout. Such angular displacement takes place within the limits imposed by the loose connection of sleeve 113 about the fixed pin 114, which permits limited displacement of link 112. Through the connection of link 112 with control arm 80, such displacement is opposed by the loading spring 90. When the torque is sufficient to overcome the force of the spring 90, bell crank 80 is angularly displaced which, by its connection to the armature 30 of the electromagnetic driver through leaf springs 42 and 43, angularly displaces the armature 30 even though magnetic biases are acting on the armature. This control of the pilot pressures through manual overriding correspondingly controls the power piston and actuates the rudder of the airplane in accordance with the command of the manual control. Thus, it will be seen that the manual override, instead of directly actuating the rudder through the mechanical linkage, operates the rudder through the power amplification of the hydraulic system.

When the automatic pilot is disconnected from the system, straight power boost through the hydraulic system is achieved in exactly the same manner as described above with the exception that the magnetic forces are completely removed from the armature of the electromagnetic driver, and the armature is actuated solely by the forces of the leaf springs 42 and 43. The loading spring 90, in addition to providing a positive neutral position for the bell crank 80 which is necessary for properly centering the armature 30, is sufficiently stiff to provide a degree of "feel" in the operation of the manual control, which gives the pilot a sense of directly operating the control surface even though such surface operation is accomplished with the aid of hydraulic power amplification.

If the aircraft is poorly damped in yaw (or in pitch or roll), the gyroscope may be left connected to the hydraulic valve at the time the autopilot function is removed. For this condition, the gyroscope functions as a damper, detecting angular rates about the axis to which it is slaved and correspondingly controlling the multiplier valve. Such a control is shown in a copending application of Clinton R. Hanna and K. A. Oplinger, Serial No. 301,584, filed July 29, 1952, entitled, "Control Apparatus," and assigned to the assignee of this invention. When used as a damper, it may be necessary to diminish the control effect of the gyroscope.

For direct mechanical operation at such times when the hydraulic system is not in use or in the event of hydraulic power failure, the manual effort is transmitted directly through the linkage to the rudder. Such slight displacement of the upper end of control arm 110, due to the torque couple adjacent its lower extremity, as may occur during this mode of operation, no longer has any effect on the hydraulic system. Moreover, the lost motion which exists about the fixed pin 114 at the upper end of the control arm 110 is not perceptible in the mechanical drive.

Although but one embodiment of this invention has been herein illustrated, it will be appreciated by those skilled in the art that numerous variations in the system both in its components and in the organization of these components may be realized without departing from the spirit and scope of this invention. Accordingly, it is intended that the foregoing disclosure and the showings made in the drawings shall be considered only as illustrative of the principles of this invention and not construed in a limiting sense.

We claim as our invention:

1. In a booster system for controlling the manuevering control means of an aircraft, the combination of, a pair of valves, each valve having a movable valve member for controlling fluid flow therethrough, an electromagnetic device having a movable armature connected with the respective valve members for moving the valve members in opposite senses to oppositely control said valves, movable pressure responsive means connected with said valves to respond to the difference of fluid pressures between the valves, means responsive to movement of said pressure-responsive means for controlling said manuevering control means, an automatic controller connected to energize said electromagnetic device, a manual controller, and spring means connecting said manual controller to said armature, to transmit forces from said manual controller to said armature.

2. In a booster control for controlling the maneuvering control means of an aircraft, the combination of, hydraulic means for controlling the maneuvering control means, valve means for controlling said hydraulic means, electromagnetic means having a movable armature for controlling said valve means, an automatic controller for controlling said electromagnetic means, a manual controller, and spring means connecting said manual controller to said armature to transmit forces from said manual controller to said armature.

3. In a booster control for controlling the maneuvering control means of an aircraft, the combination of, hydraulic means for controlling the maneuvering control means, valve means for controlling said hydraulic means, electromagnetic means having a movable armature for controlling said valve means, an automatic controller for controlling said electromagnetic means, a manual controller, and a resilient linkage having a deflectable member connecting said manual controller to said armature to transmit forces from said manual controller to said armature.

4. Electromagnetically operated valve mechanism comprising, a valve having a movable valve control member, an electromagnetic device having an armature engageable with the valve control member to cause movement thereof upon energization of said electromagnetic device, resilient centering member connected to said armature to center said armature, and means connected to said resilient member to cause deflection thereof and apply forces therethrough to said armature.

5. Electromagnetically operated valve mechanism comprising, a pair of valves each having a movable valve member, an electromagnetic device having a movable armature pivotally mounted between said valve members, said armature having end portions engageable with said valve members and operating said valve members in opposite senses upon pivotal movement of said armature member, coil means on said electromagnetic device for causing pivotal movement of said armature member when energized, a radial arm projecting from said armature, and spring means engaging said radial arm adjacent its extremity for pivotally biasing said armature to a given position.

6. Electromagnetically operated valve mechanism comprising, a pair of valves each having a movable valve member, an electromagnetic device having a movable armature pivotally mounted between said valve members, said armature having end portions engageable with said valve members and operating said valve members in opposite senses upon pivotal movement of said armature member, coil means on said electromagnetic device for causing pivotal movement of said armature member when energized, a radial arm projecting from said armature, and a flat leaf spring mounted on each side of said radial arm and engaging said radial arm adjacent its extremity for pivotally biasing said armature to a given position.

7. Electromagnetically operated valve mechanism comprising, a support, a pair of valves mounted on said support, each valve having a movable valve member, an electromagnetic device having an armature pivotally mounted substantially at its center, said electromagnetic device being mounted on said support between said valves, said armature having end portions engaging said valve members for moving said valve members in opposite senses upon pivotal movement of said armature, coil means on said electromagnetic device for causing pivotal movement of said armature, a radial arm on said armature, a rotatable shaft on said support, a pair of flat springs each connected at one end to said shaft and radially extending therefrom in substantially parallel spaced relation, said springs at their free ends engaging opposite sides of said radial arm adjacent its extremity, and means for angularly displacing said shaft.

8. Electromagnetically operated valve mechanism comprising, a support, a pair of valves mounted on said support, each valve having a movable valve member, an electromagnetic device having an armature pivotally mounted substantially at its center, said electromagnetic device being mounted on said support between said valves, said armature having end portions engaging said valve members for moving said valve members in opposite senses upon pivotal movement of said armature, coil means on said electromagnetic device for causing pivotal movement of said armature, a radial arm on said armature, a rotatable shaft on said support, a pair of flat springs each connected at one end to said shaft and radially extending therefrom in substantially parallel spaced relation, said springs at their free ends engaging opposite sides of said radial arm adjacent its extremity, spring means biasing said shaft to a given angular position, and means for angularly displacing said shaft.

9. Electromagnetically operated valve mechanism comprising, a support, a pair of valves mounted on said support, each valve having a movable valve member, an electromagnetic device having an armature pivotally mounted substantially at its center, said electromagnetic device being mounted on said support between said valves, said armature having end portions engaging said valve members for moving said valve members in opposite senses upon pivotal movement of said armature, coil means on said electromagnetic device for causing pivotal movement of said armature, a radial arm on said armature, a rotatable shaft on said support, a pair of flat springs each connected at one end to said shaft and radially extending therefrom in substantially parallel spaced relation, said springs at their free ends engaging opposite sides of said radial arm adjacent its extremity, a crank arm connected to said shaft, loading spring means connected to said crank arm for biasing said crank arm to a given angular position, actuating means connected to said crank arm to angularly displace said crank arm against said loading spring means, and means for limiting angular displacement of said crank arm from said given angular position in each direction.

10. An aircraft flight control system comprising, a servo drive, a movable member for controlling said servo drive, a manually operated linkage, said servo drive and said manually operated linkage being connected to a control surface of said aircraft, a loosely pivoted control arm having radially displaced points of connection with said linkage, and means connected with said control arm and said movable member to actuate said movable member by displacement of said control arm at its point of loose pivoting.

11. An aircraft flight control system comprising, a servo drive, a movable member for controlling said servo drive, a control arm, pivot means loosely pivoting said control arm, means including a resilient connection connecting said control arm adjacent its point of loose pivoting to said movable member, and a manually operated push rod linkage connected to said control arm at radially displaced points so that force transmission through said linkage displaces said control arm at its point of loose pivoting, said servo drive and said linkage being connected to a control surface of said aircraft.

References Cited in the file of this patent

UNITED STATES PATENTS

| | | |
|---|---|---|
| 1,853,613 | Herr | Apr. 12, 1932 |
| 1,855,349 | Hammond | Apr. 26, 1932 |
| 2,208,421 | Hanna | July 16, 1940 |
| 2,272,725 | Overbeke | Feb. 10, 1942 |
| 2,336,887 | Piron | Dec. 14, 1943 |
| 2,398,421 | Frische | Apr. 16, 1946 |
| 2,485,094 | Gundersen | Oct. 18, 1949 |
| 2,600,348 | Walthers | June 10, 1952 |
| 2,630,828 | Bent | Mar. 10, 1953 |
| 2,655,132 | Scheib, Jr. | Oct. 13, 1953 |
| 2,678,177 | Chenery et al. | May 11, 1954 |
| 2,700,986 | Gunn | Feb. 1, 1955 |
| 2,741,478 | Mercier | Apr. 10, 1956 |